(No Model.)
2 Sheets—Sheet 1.
P. H. JACKSON.
WIND WHEEL.
No. 264,164. Patented Sept. 12, 1882.
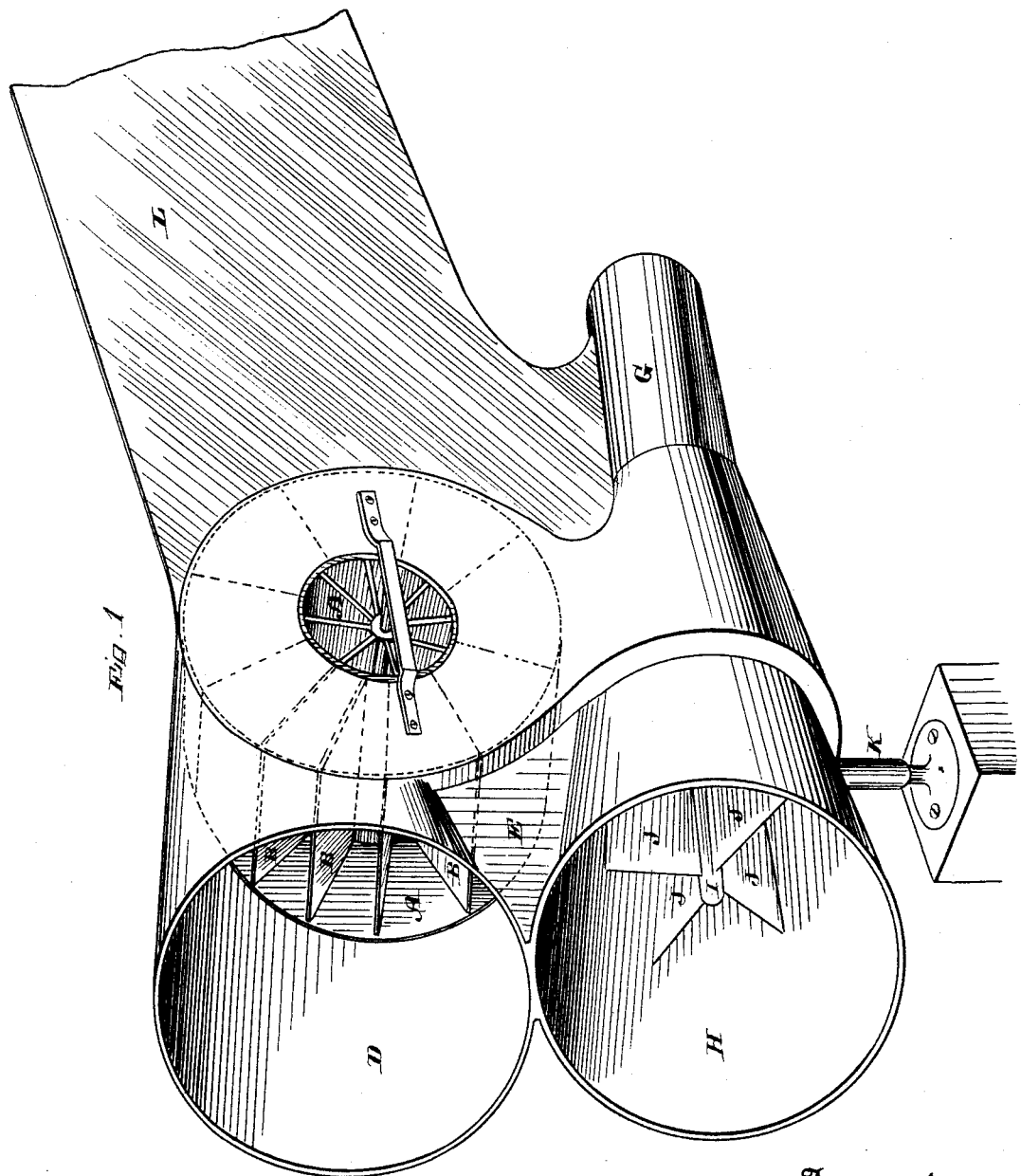
Witnesses:
Geo. H. Strong.
L. H. Towne
Inventor,
P. H. Jackson
By Dewey & Co.
Attorneys

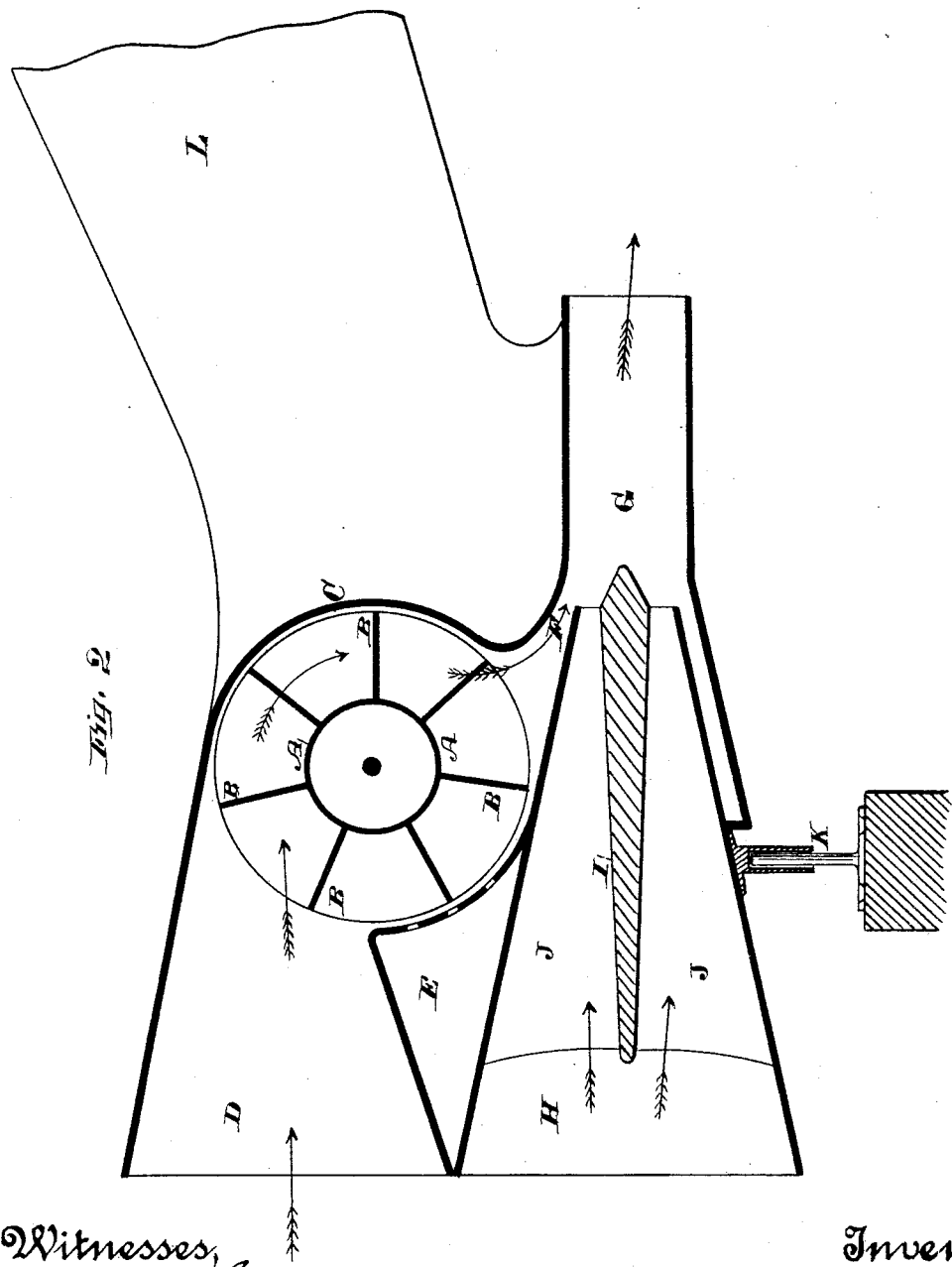

UNITED STATES PATENT OFFICE.

PETER H. JACKSON, OF SAN FRANCISCO, CALIFORNIA.

WIND-WHEEL.

SPECIFICATION forming part of Letters Patent No. 264,164, dated September 12, 1882.

Application filed July 25, 1882. (No model.)

*To all whom it may concern:*

Be it known that I, PETER H. JACKSON, of the city and county of San Francisco, State of California, have invented an Improved Wind-Wheel; and I hereby declare the following to be a full, clear, and exact description thereof.

My invention relates to a wind apparatus for producing power; and it consists of a wheel having radial floats mounted within a case having a funnel-shaped receiver to direct the wind upon the upper part of the wheel. The wind follows the close case around to the point of exit near the bottom, where it escapes into the discharge-flue. In front of this flue, and beneath the funnel which supplies the wheel, is a second funnel, having spirally-placed wings within it. This funnel extends into the discharge-flue before referred to, so that there is a space all around it, and the action of the air-blast passing through this funnel will produce a vacuum or draft through the wheel-case, which will assist in its revolution.

Referring to the accompanying drawings for a more complete explanation of my invention, Figure 1, Sheet 1, is a perspective view of my device. Fig. 2, Sheet 2, is a longitudinal vertical section.

A is a wheel, which may have any desired width of face, which corresponds to the length of the radial floats B, against which the wind-current impinges. This wheel has its axle journaled in a case, C, which surrounds the wheel in close proximity, except at the points where the air is admitted and has its exit.

D is a horizontal funnel-shaped opening or tube, standing in line with the floats B of the upper part of the wheel, those of the lower part being protected from the air-current by the front portion, E, of the case. The rim of the case follows the curve of the wheel closely around the back part to the point F, where the air escapes into the discharge-tube G.

Below the funnel D is a second funnel, H, its large end opening in the same direction. The small end enters the discharge-tube G of the wheel-case, and is enough smaller than that tube to have a considerable space all around the end of H.

Within the funnel H is a tapering center, I, around which radial wings J are fixed, their edges extending out to the periphery of the funnel, while in length they may nearly or quite equal that of the funnel. These wings are slightly twisted from end to end, so as to give the passing air a spiral twist—say from one-third or one-half a circuit in the length. As this current rushes through the funnel H and escapes at the rear end into the passage G it is thrown outward, so as to fill this passage, by the centrifugal action, and it causes a vacuum within that portion of G which surrounds H. This draws the air through the opening F from the wheel-case, and by thus producing a vacuum within it assists in driving it.

The whole apparatus is mounted upon a vertical spindle, K, and has a direction tail or vane, L, extending in the opposite direction from the funnel-openings, so as to keep them to the wind.

The wheel-shaft may be connected in any suitable manner with a pump or other mechanism, which is to be driven by it.

Having thus described my invention, what I claim as new, and desire to secure by Letters Patent, is—

1. The funnel or tube D, with its directing-vane L, mounted upon the vertical shaft or spindle K, in combination with the wheel A, having radial floats B and its axle journaled within the case C E, the air-escape passage F, and tube G, substantially as herein described.

2. The funnel D and wheel A B, rotating within the case C, as shown, in combination with the escape-tube G and the supplemental funnel H, with its smaller end entering the tube G, so as to have a space around its exterior, substantially as herein described.

3. The funnel D and wheel A B, rotating within the case C, and having the escape-tube G, in combination with the funnel H, the small end of which stands within the tube G, said funnel having the spirally-placed wings J and center I, substantially as herein described.

In witness whereof I hereunto set my hand.

PETER H. JACKSON.

Witnesses:
G. W. EMERSON,
E. BRANDON.